United States Patent Office 3,300,547
Patented Jan. 24, 1967

---

3,300,547
ADHESIVE ANAEROBIC COMPOSITION AND
METHOD OF PRODUCING SAME
Jeremy W. Gorman, West Hartford, Conn., and Birger W. Nordlander, Schenectady, N.Y., assignors to Loctite Corporation, Newington, Conn., a corporation of Connecticut
No Drawing. Filed Mar. 5, 1964, Ser. No. 349,755
5 Claims. (Cl. 260—885)

The present invention relates to adhesive sealant compositions for bonding adjacent surfaces. More particularly it relates to polymerizable anaerobic compositions possessing adhesive characteristics, which compositions remain in the liquid, unpolymerized state as long as contact with air or oxygen is maintained and rapidly polymerize to the solid state upon the exclusion of air or oxygen.

Anaerobic compositions known heretofore, while exhibiting the ability to bond threaded surfaces quickly and effectively, have not been used commercially for bonding the smooth surfaces of tube joints and the like since the predominant strength of the bonds thus produced was torsional in nature. However there has arisen in the plumbing industry an increased demand for liquid or readily flowable sealants which will readily set upon assembly and can be used in place of solder, particularly without the need for the application of heat.

It is accordingly an object of the present invention to provide anaerobic bonding compositions possessing adhesive characteristics and being capable of securely sealing tube joints and the like.

An additional object of the present invention is to provide a new and improved anaerobic curing composition useful for bonding smooth surfaces, which compositions will provide adhesive bonds of high tensile strength yet will exhibit extended shelf stability in the presence of oxygen.

Another object of the present invention is to provide a rapidly curing anaerobic composition which is stable for extended periods of time, can be easily applied to adjacent surfaces and at ambient temperatures will form adhesive bonds of high tensile strength in relatively short periods of time.

A further object is to impart such adhesive qualities without detrimentally affecting the anaerobicity of the composition.

According to the present invention it has been found that the above and related objects may be accomplished by utilizing anaerobic curing compositions comprised of acrylate ester monomers, a hydroperoxide catalyst and certain adhesion imparting materials readily incorporable into the anaerobic systems. The adhesive materials are characterized by their compatibility with the other components of the anaerobic system so as not to alter the anareobic curing characteristics or the storage stability of the system while at the same time advantageously possessing the ability both to attack the surfaces to be adhered and to incorporate themselves into the polymeric structure upon cure.

Adhesive imparting materials which possess this twofold efficacy consist essentially of polymerized compositions capable of adjusting the strength of bonding as well as the viscosity of the anaerobic system. These polymerized compositions may be utilized separately or in combination with adhesive promoters which are generally categorized by the presence of both a polymerizable ethylenic linkage and a polar function group adjacent the linkage, that is, directly attached to the unsaturated carbon atom or about four or five atoms removed therefrom. Additionally, stabilizers such as those described in United States Patent No. 3,043,820 may be incorporated into the basic sealant composition as may be the accelerators of United States Patent No. 3,046,262.

The anaerobic curing compositions to which the present invention is directed are those which contain monomers broadly categorized as polymerizable polyacrylate esters which, in the presence of a suitable catalyst, polymerize to the solid state upon the exclusion of oxygen. The polyacrylate esters found most suitable for the present invention are those wherein the only polymerizable double bonds are located in the acrylic radicals thereof. More particularly, these monomers may be represented by the following general formula:

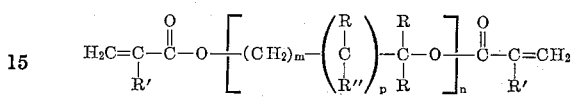

wherein R represents a radical selected from the group consisting of hydrogen, lower alkyl of 1–4 carbon atoms, inclusive, hydroxy alkyl of 1–4 carbon atoms inclusive, and

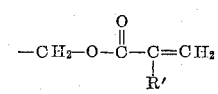

R′ is a radical selected from the group consisting of hydrogen, halogen, and lower alkyl of 1–4 carbon atoms; R″ is a radical selected from the group consisting of hydrogen, —OH and

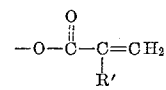

$m$ is an integer equal to at least 1, e.g., from 1 to 8 or higher, for instance, from 1 to 4 inclusive; $n$ is an integer equal to at least 1, for example 1 to 20 or more; and $p$ is one of the following: 0, 1.

The polymerizable polyacrylate esters utilized in accordance with the invention and corresponding to the above general formula are exemplified by but not restricted to the following materials: diethylene glycol dimethacrylate, triethylene glycol dimethacrylate, tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers are included. As used herein the term "polymerizable polyacrylate ester" includes not only the foregoing monomers in the pure and impure state, but also those other compositions which contain those monomers in amounts sufficient to impart to the compositions anaerobic curing characteristics. It is also within the scope of the present invention to obtain modified characteristics for the cured composition by the utilization of one or more monomers within the above formula with other unsaturated monomers such as unsaturated hydrocarbons or unsaturated esters.

In United States Patent No. 2,895,950 there is described and claimed anaerobic curing compositions having the desired air-stability by the use of certain nonpolymerizing organic hydroperoxides, which hydroperoxides are characterized by the fact that the atoms directly linked to the carbon atom bearing the hydroperoxide radical are selected from the group consisting of carbon, hydrogen, nitrogen or oxygen, and, in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase, particularly by passing oxygen or an oxygen-containing gas through the compounds, preferably ethers, ketones and hydrocarbons. The mixture of these catalysts with the monomer is highly sensitive to contact with air so that the catalyst remains inactive or ineffective in the presence of oxygen, but upon exclusion therefrom will initiate polymerization of the monomer. Further details concerning the preparation and specific examples of such hydroperoxide catalysts can be readily obtained from the specification of the aforementioned patent.

In addition to the organic hydroperoxide catalysts defined in that patent, the present invention additionally enables the utilization of a broadened class of hydroperoxides for the preparation of anaerobic curing compositions having the characteristic of stability in the presence of air at ambient temperatures for extended periods of time. Although the peroxide catalysts preferably utilized are those generally categorized as hydroperoxides, it has been found that readily hydrolyzable peresters, such as t-butyl perbenzoate may also be used. Such peresters are believed to form hydroperoxides in situ, which hydroperoxides are considered to be within the scope of the present invention.

Although as little as 0.01 percent of catalyst can be employed, it is preferable to utilize about 1 to 10 percent by weight of the catalyst for optimum speed in curing as well as long storage characteristics. Amounts in excess of 20 percent by weight produce no additional beneficial effect and, in fact, have a tendency to act as a diluent for the cured composition.

The adhesive imparting materials of the present invention possess the dual capacity for ready assimulation into the anaerobic system without detrimental effect thereon while at the same time enhancing the dimensional stability of the bonding material upon cure, thus contributing to the adhesive ability of the anaerobic composition. The materials yielding the best results are polymers having a molecular weight between two thousand and forty thousand and, more particularly, polyester resins, both modified and unmodified having such molecular weights. As used herein the expression "polymeric polyester resin" refers to polymers containing multiple ester linkages, either in the chain or on side chains. Among these resins the acrylic copolymers are most desirable due to their flexibility and adaptability to the anaerobic system. For example, the 80-20 styrene-acrylate copolymer having a molecular weight of about 30,000 sold under the name "Pliolite AC" by the Goodyear Tire and Rubber Co., Akron, Ohio, has been used with good success.

Generally the adhesive additives of the present invention produce a significant effect in amounts as low as 0.5 percent by weight of the monomer. However, a commercially acceptable range for most sealant compositions is about 2–30 percent by weight depending, inter alia, on the strength of the bond desired, the other components utilized and the materials to be bonded. Adhesive additives in amounts up to 50 percent by weight may be utilized but generally tend to make the composition too viscous without a proportional increase in the beneficial results obtained from such an addition.

According to the present invention it also has been found that enhancement of the adhesive character of the composition may be effectuated by the incorporation into the anaerobic composition of adhesive promoters characterized by the presence of a polymerizable terminal double bond or ethylenic linkage adjacent a polar functional group of the compound. Preferably the material has only a single polar group which is selected from the class consisting of carboxyl radicals, anhydride radicals, hydroxyl radicals, cyano radicals and secondary and tertiary amino radicals. Exemplary of these adhesive promoting materials are the following acids and their anhydrides: crotonic, itaconic, nadic, methylnadic, acrylic, methacrylic and maleic, as well as materials such as cyanoethyl acrylate, acrylonitrile, hydroxyethylmethacrylate, N,N-dimethylamino ethyl methacrylate and N,N-ditertiarybutyl amino ethylacrylate. Mixtures of these materials may also be employed with good results.

It has been found commercially desirable according to the present invention to utilize only those adhesive materials and promoters which are soluble in the basic monomer-catalyst system to thereby facilitate their incorporation therein and obviate any detrimental effect on the anaerobicity of the system. Additionally, it is desirable to avoid where possible a multiple phase system with its attendant difficulties.

Generally the amount of promoter utilized to enhance the adhesiveness of the system is susceptible to large variations. However, between 0.03 and 30 percent by weight has been found satisfactory for most purposes with a preferred range being 0.3 to 20 percent by weight. Although greater amounts tend to dilute the monomer, such amounts may be used if additional accelerators are employed. Accordingly, accelerators selected from the group consisting of imides, formamides and combinations thereof may be employed when deemed necessary.

Of the various accelerators, the sulfimides having the following general formula:

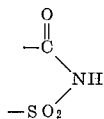

have proven to be most preferable in that they not only provide greatly accelerated curing characteristics but also enable the provision of compositions which exhibit excellent shelf stability over extended periods of time. The metallic salts of the sulfimides are also highly effective as an accelerator but exhibit poor shelf stability, and so organic sulfimides rather than metallic sulfimide salts are preferred. Of the sulfimides, benzoic sulfimide has proven most beneficial in that it not only provides optimum acceleration but good shelf stability and is, therefore, the preferred accelerating agent.

The addition of amine accelerators to the sulfimides may also be employed but it has been found that they provide only a slight advantage in terms of activity and greatly reduce shelf life so that amines should be excluded from sulfimide mixtures when shelf life is desired.

When the accelerators are employed, they generally have been found effective in amounts as low as 0.01 percent by weight and up to as high as 10 percent by weight. When using the sulfimides the preferred operating range is about 0.1–5 percent by weight.

Typical of a formulation which has proven highly effective as an anaerobic adhesive composition is the following:

| Components: | Approximate percent by weight |
|---|---|
| Monomer (tetraethylene glycol dimethacrylate) | 80.8 |
| Catalyst (cumene hydroperoxide) | 0.1 |
| Accelerator (benzoic sulfimide) | 0.2 |
| Adhesive (styrene-acrylate copolymer-Pliolite AC) | 12.0 |
| Promoter (acrylic acid) | 6.0 |

The ingredients may be mixed at ordinary room temperature and at a time which is well in advance of the actual use of the composition. So long as some air is present, which may be nothing more than a small layer of air in a properly shaped sealed container as of glass, or preferably of polyethylene, or other container which permits the passage of air therethrough, the material will not polymerize upon storage for prolonged periods of time even as long as one year or more. However, when the mixture is entirely excluded from contact with air, such as when the same is applied between adjacent metal surfaces such as between metal plates, etc., the material will rapidly polymerize and form a strong bond exhibiting good adhesiveness and tensile strength. The time required to form such a bond upon the exclusion of air may be varied over a wide range by the proper selection of the particular materials added and the amount thereof, and by varying the temperature during polymerization. If desired, the setting time when air is excluded may be reduced to as little as three minutes or less, or may be extended to the range of an hour or so where rapid setting is not essential or desirable.

Because of the efficacy of these sealant compositions, only small amounts are necessary to bond mating surfaces, and a few drops of the composition will suffice for bonding the cooperating surfaces of a pipe joint or the like. The surfaces to which the sealant is to be applied should be free from grease or contamination prior to application. When used on softer metals, such as aluminum and copper, or when the engagement ratio between the members to be joined is high, it may be desirable to reduce the shear strength produced by the sealant mixture through the incorporation of compatible diluents.

The compositions are nonvolatile and may be varied in viscosity by means of the particular monomer selected and by use of thickening agents. It is generally desirable to have a thin liquid of low viscosity having good capillary action for purposes of bonding closely fitting surfaces or for bonding previously assembled parts by penetration of the sealant composition between the mating surfaces. In bonding loose fitting surfaces or for filling large spaces or voids, high viscosity sealant compositions are preferable.

The sealant compositions may be applied dropwise and allowed to penetrate between adjacent surfaces through capillary action or the parts may be precoated in tumbling, spraying or dipping operations. Most metals will catalyze the cure of the sealant compositions; however, certain metals such as cadmium and zinc do not exhibit the catalytic speed of other metal surfaces and it is preferred to treat one or both of the mating surfaces with a heavy metal compound which is soluble in the sealant mixture, such as ferric chloride, cobalt, manganese, lead, copper and iron soaps.

To determine the long term or shelf stability of the sealant compositions, a simple but effective test has been developed. The sealant is placed in suitable containers, such as test tubes, which are then placed in a temperature controlled environment, such as a water bath maintained at 82±1° C. At the end of predetermined intervals, generally ten minutes or less, a glass rod is dropped into the sealant. If the rod strikes the bottom of the test tube the composition has not gelled. When the viscosity of the gelling sealant prevents the rod from striking the bottom, the time is noted. It has been found that a sealant still free from gelling for thirty minutes or more during this accelerated heat aging test will be free from gelling at ambient temperatures in the presence of oxygen for at least one year, which is the commercially desirable minimum shelf life.

As mentioned hereinabove, although anaerobic compositions heretofore have exhibited good bonding against torsional forces, the bonds produced thereby have exhibited low tensile strength. In order to illustrate the effectiveness of the present invention and uniformly test the adhesive strengths of these compositions, a standard test procedure has been established. According to this procedure two blocks of metal, preferably steel, having dimensions of 1" x 2" x ¼" are bonded to each other by applying a thin layer of the material to be tested to one 2" x ¼" side of the first of the two blocks so as to completely coat or cover that surface. A 2" x ¼" surface of a second block is then placed in firm contact with the coated side of the first block to thereby provide not only a continuous bonding surface area of one-half square inch but also to insure that no point of the bonded area is greater than one-eighth of an inch from the air. This latter feature is utilized in view of the air sensitivity of the material and in order to maintain the resultant tensile strengths at relatively lower values than might otherwise be obtained on surfaces of different configuration. The adhesive may be allowed to set at room temperature; however, since the test results are frequently desired as quickly as possible, it is preferable to accelerate the cure by heating the assembly for short periods of time. The tensile strength of the bond obtained thereby is then measured by noting the force required to separate the blocks. Generally an adhesive material exhibiting a tensile strength of 1000 p.s.i. (pounds per square inch) on steel blocks is considered satisfactory although a strength greater than 2000 p.s.i. is preferred. When using copper tubing the tensile shear strengths obtained are about one-half the values found satisfactory for the steel blocks.

The following examples are included for purposes of illustration so that the invention may be more readily understood and are not intended to limit the scope of the invention unless otherwise specifically indicated.

EXAMPLE 1

An adhesive anaerobic mixture was prepared by mixing 50 cc. of tetraethylene glycol dimethacrylate, 1 cc. of cumene hydroperoxide and 6 grams of an 80-20 styrene-acrylate copolymer having a molecular weight of about 30,000 ("Pliolite AC"). A sample of the mixture was tested for shelf stability at 82° C. and showed a stability of more than thirty minutes. The composition was applied in a thin layer to one 2" x ¼" surface of a steel block and a second steel block was then placed in firm contact therewith. The assembled blocks were heated for one-half hour at 250° F. Upon testing, the adhesive bond thus formed exhibited a tensile strength of 3040 p.s.i. (pounds per square inch).

EXAMPLE 2

To illustrate the distinct improvement in adhesiveness effected according to the present invention, six different samples were prepared using only monomer, catalyst, imide accelerator and adhesive in the amounts indicated. Each sample was applied to steel blocks in the manner set forth in Example 1 and the cure was accelerated by heating for one-half hour at 250° F. In each sample 50 cc. of tetraethylene glycol dimethacrylate was used as the monomer together with 1 cc. of cumene hydroperoxide as the catalyst. As can be seen in Table 1 an increase in tensile strength greater than tenfold is effectuated by the addition of the adhesive imparting material.

TABLE 1

| Sample No. | Adhesive | | Benzoic Sulfimide, gms. | Tensile Strength (p.s.i.) |
|---|---|---|---|---|
| | Component | Amts. | | |
| 1 | None | | None | 150 |
| 2 | None | | 0.15 | 200 |
| 3 | Pliolite AC | 4.5 gms. | 0.15 | 2,400 |
| 4 | Pliolite AC | 4.5 gms. | 0.15 | 3,940 |
| | Acrylic acid | 1.0 cc. | | |
| 5 | Pliolite AC | 4.5 gms. | 0.15 | 2,840 |
| | Cyanoethylacrylate | 4.0 cc. | | |
| 6 | Pliolite AC | 4.5 gms. | 0.15 | 2,860 |
| | Hydroxyethylmethacrylate | 4.0 cc. | | |

EXAMPLE 3

An adhesive mixture was prepared from 490 cc. of triethylene glycol dimethacrylate, 14 cc. of cumene hydroperoxide, 10 gms. of benzoic sulfimide, 0.07 cc. of amino propanol, 40 cc. of acrylic acid, 10 cc. of acrylic anhydride, and 225 gms. of "Pliolite AC." The mixture had a shelf stability on heat aging at 82° C. of greater than 30 minutes and upon curing between standard size steel blocks for 20 minutes at 250° F. gave tensile strength of 3,900 p.s.i.

EXAMPLE 4

To 90 cc. of tetraethylene glycol dimethacrylate was added 4 cc. of cumene hydroperoxide, 0.6 gms. of benzoic sulfimide and an adhesive component containing 24 cc. of acrylic acid and 60 gms. of "Pliolite AC." A few drops of this material was placed on the 2″ by ¼″ side of a steel block. A second block was affixed thereto and the blocks were heated for one hour at 150° F. The tensile strength of the bond thus produced was 3,380 p.s.i.

EXAMPLE 5

To 160 cc. of tetraethylglycol dimethacrylate was added 4 cc. of cumene hydroperoxide, 2 gms. of benzoic sulfimide, 1.6 cc. of arcylic acid and 40 gms. of "Pliolite AC." The mixture was placed between steel blocks and cured for 15 minutes at 250° F. The tensile strength of the bond thus produced was 3,200 p.s.i.

EXAMPLE 6

To 350 cc. of tetraethylene glycol dimethacrylate was added 10 cc. of cumene hydroperoxide, 5 gms. of benzoic sulfimide, 2.5 cc. of amino propanol, 110 gms. of "Pliolite AC" and 7.5 cc. of methacrylic anhydride. Between steel blocks, this material produced a bond having a tensile strength of 3,100 p.s.i. after a one hour cure at 350° F.

EXAMPLE 7

To 310 cc. of tetraethylene glycol dimethacrylate was added 10 cc. of cumene hydroperoxide, 5 gms. of benzoic sulfimide, 0.06 cc. of amino propanol, 125 gms. of "Pliolite AC" and 20 cc. of a 50/50 mixture of methacrylic acid and methyl madic anhydride. Upon cure at 250° F. for 15 minutes between steel blocks the bond exhibited a tensile strength of 2,700 p.s.i.

EXAMPLE 8

To 175 cc. of triethylene glycod dimethacrylate was added 4 cc. of cumene hydroperoxide, 2 gms. of benzoic sulfimide 20 gms. of "Pliolite AC" and 6 gms. of itaconic acid. The composition was applied to steel blocks which subsequently were assembled. The bond was heat cured for 20 minutes at 230° F. and upon testing gave a tensile strength value of 2,560 p.s.i.

EXAMPLE 9

Sample compositions were prepared by mixing 325 cc. of tetraethylene glycol dimethacrylate, 25 cc. of cumene hydroperoxide, 10 cc. of triethyl amine, 0.05 cc. of amino propanol, 0.05 cc. of benzoquinone and 125 gms. of "Pliolite AC." To each of these samples was added 50 cc. of one of the adhesive promoters set forth in the following table. The various samples were used to adhere ½ inch copper pipe and after 15 minute cures at 250° F. gave the indicated tensile shear strengths.

TABLE 2

| Adhesive promoter: | Tensile shear strength P.S.I. |
|---|---|
| Methacrylic acid | 1,620 |
| Cyanoethyl acrylate | 1,700 |
| Dimethylaminoethyl methacrylate | 1,270 |

EXAMPLE 10

To 250 cc. of polyethylene glycol dimethacrylate was added 17.5 cc. of cumene hydroperoxide, 5 cc. of triethyl amine, 10 percent "Pliolite AC," 80 p.p.m. benzoquinone, 2 percent by weight methacrylic acid and 5 percent by weight acrylonitrile. The composition was tested on ½ inch copper pipe. The resultant tensile shear strength obtained after curing for fifteen minutes at 250° F. was 1,300 p.s.i.

As will be apparent to those skilled in the art various equivalents and modifications within the realm of the invention may be utilized and are intended to be included within the scope of the appended claims.

We claim:
1. A liquid adhesive composition capable of producing between smooth steel surfaces a pipe adhering bond having a tensile strength greater than 1,000 p.s.i., said composition having extended shelf life in the presence of oxygen and being capable of rapidly polymerizing upon the exclusion of oxygen comprising an anaerobic curing composition containing a polyacrylate monomer and a hydroperoxide catalyst, and at least 0.5 percent by weight of an adhesive imparting material characterized by its compatability with the other components of the anaerobic composition, said adhesive imparting material comprising a styrene-acrylic copolymer soluble in the monomer and having a molecular weight of 2,000 to 40,000.

2. The adhesive composition of claim 1 including a polymerizable adhesive promoter capable of enhancing the adhesiveness of the composition, said promoter containing a polymerizable ethylenic linkage and a polar functional group adjacent said linkage, said polar function group being a member selected from the group consisting of carboxyl, anhydride, hydroxyl, cyano and secondary and tertiary amino radicals.

3. A liquid adhesive composition capable of producing between smooth steel surfaces a pipe adhering bond having a tensile strength greater than 1,000 p.s.i., said composition having extended shelf life in the presence of oxygen and being capable of rapidly polymerizing upon the exclusion of oxygen comprising an anaerobic curing composition containing a polyacrylate monomer and a hydroperoxide catalyst, and at least 0.5 percent by weight of an adhesive imparting material characterized by its compatability with the components of the anaerobic composition, said polyacrylate monomer corresponding to the general formula:

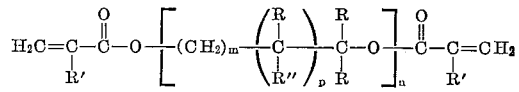

wherein R is a member selected from the group consisting of hydrogen, lower alkyl of 1–4 carbon atoms, hydroxy alkyl of 1–4 carbon atoms, and

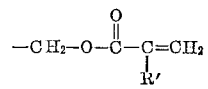

R' is a member selected from the group consisting of hydrogen, halogen, and lower alkyl of 1–4 carbon atoms, R″ is a member selected from the group consisting of hydrogen, —OH and

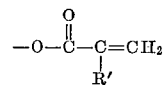

m is an integer equal to at least 1, n is an integer equal to at least 1 and p is one of the following: 0, 1; said adhesive imparting material comprising a styrene-acrylic copolymer soluble in said monomer and having a molecular weight between about 2,000 and 40,000 and a polymerizable adhesive promoter capable of enhancing the adhesiveness of the composition, said promoter comprising a polymerizable ethylenic linkage and a polar functional group adjacent said linkage, said polar functional group being a member selected from the group consisting of carboxyl, anhydride, hydroxyl, cyano and secondary and tertiary amino radicals.

4. The adhesive composition of claim 3 wherein the copolymer has a molecular weight of about 30,000 and the promoter is acrylic acid.

5. An adhesive anaerobic composition capable of producing between steel surfaces a bond having a tensile strength greater than 1,000 p.s.i. and comprising
   (a) tetraethylene glycol dimethacrylate;
   (b) about 0.01 to 20.0 percent by weight of cumene hydroperoxide;
   (c) about 2.0 to 30.0 percent by weight of a styrene-acrylate copolymer having a molecular weight of about 30,000; and
   (d) about 0.3 to 20.0 percent of acrylic acid.

References Cited by the Examiner

UNITED STATES PATENTS

| | | | |
|---|---|---|---|
| 2,373,488 | 4/1945 | Marks | 260—885 |
| 2,859,200 | 11/1958 | Lappala | 260—885 |
| 2,884,404 | 4/1959 | Parker | 260—872 |
| 3,046,262 | 7/1962 | Krieble | 260—89.5 |
| 3,084,436 | 4/1963 | Landry | 260—885 |
| 3,149,021 | 9/1964 | Goepfert et al. | 260—872 |

FOREIGN PATENTS 584,857    1/1947    Great Britain.

MURRAY TILLMAN, *Primary Examiner.*

J. T. GOOLKASIAN, *Assistant Examiner.*